US006759441B1

(12) United States Patent
Kerres et al.

(10) Patent No.: US 6,759,441 B1
(45) Date of Patent: Jul. 6, 2004

(54) ACID-BASE POLYMER BLENDS AND THEIR USE IN MEMBRANE PROCESSES

(75) Inventors: Jochen Kerres, Ostfildern (DE); Wei Cui, Stuttgart (DE)

(73) Assignee: Universitat Stuttgart Lehrstuhl und Institut fur Chemische Verfahrenstechnik, Stuttgart (DE)

(*) Notice: Subject to any disclaimer, the term of this patent is extended or adjusted under 35 U.S.C. 154(b) by 0 days.

(21) Appl. No.: 09/647,804

(22) PCT Filed: Apr. 16, 1999

(86) PCT No.: PCT/EP99/02756

§ 371 (c)(1),
(2), (4) Date: Feb. 9, 2001

(87) PCT Pub. No.: WO99/54389

PCT Pub. Date: Oct. 28, 1999

(30) Foreign Application Priority Data

Apr. 18, 1998 (DE) ......................... 198 17 376

(51) Int. Cl.$^7$ ................................. C08J 5/20
(52) U.S. Cl. .......................... 521/27; 521/28
(58) Field of Search ..................... 521/27, 28

(56) References Cited

U.S. PATENT DOCUMENTS 5,178,765 A    1/1993  Hu et al.

FOREIGN PATENT DOCUMENTS

| DE | 4026154 | 2/1992 |
| DE | 19632285 | 2/1998 |
| EP | 0337626 | 10/1989 |
| EP | 0574791 | 12/1993 |
| EP | 0576830 | 1/1996 |
| GB | 2 216 134 | * 10/1989 |
| JP | 4071626 | 3/1992 |
| WO | WO 9416002 | 7/1994 |
| WO | WO 9508581 | 3/1995 |
| WO | 96/13872 | * 5/1996 |

OTHER PUBLICATIONS

Jochen Kerres, et al., "Synthesis and Characterization of Novel Acid–Base Polymer Blends for Application in Membrane Fuel Cells," Solid State Ionics, 125:243–249 (1999).
W. Cui, et al., "Development and Characterization of Ion–Exchange Polymer Blend Membranes," Separation and Purification Technology, 14:145–154 (1998).
J. Kerres, et al., "Development of Membranes for Electrolysis and Fuel Cell Membranes" Kolloquium '1997, Wasserstoff Als Energietrager der Universitat Stuttgart, Arbeits– und Ergebnisbericht, 169–193.
A.J. Van Zyl, et al., "Perfluorosulfonate Ionomer Membranes for Separation of Petrochemical Mixtures," J. Mat. Sci. Lett., 15:1454–1456 (1996).

J. Kerres, et al., "New Sulfonated Engineering Polymers via the Metalation Route. I. Sulfonated Poly(ethersulfone) PSU Udel via Metalation–Sulfination–Oxidation," J. Polymer Sci., PtA: Polymer Chem. 34:2421–2438 (1996).
Michael D. Guiver, et al., "Chemical Modification of Polysulfones II: An Efficient Method for Introducing Primary Amine Groups onto the Aromatic Chain," Macromolecules, 28:7612–7621 (1995).
C. Geraldine Bazuin, "Ionomers (Compatibilization of Blends)", Polymeric Materials Encyclopedia, 5:3454–3460 (1996).
Xinsheng Zhang et al., "NMR and Dynamic Mechanical Studies of Miscibility Enhancement via Ionic Interactions in Polystyrene/poly(ethyl Acrylate) Blends," Journal of Polymer Science: Part B: Polymer Physics, 28:1842–1857 (1990).
Kenji Miyatake, et al., "Synthesis of Poly(phenylene sulfide sulfonic acid) via Poly(sulfonium cation) as a Thermostable Proton–conducting Polymer," Macromolecules, 29:6969–6971 (1996).
L. Matejcek, et al., "Die Membranbrennstoffzelle: Untersuchungen an Membran/Elektrodeneinheiten," Jahrestagung 1995 der Fachgruppe Angewandte Electrchemie der GDCH, Duisburg (1995).
R. Nolte, et al., "Partially Sulfonated Poly(arylene ether sulfone)—A Versatile Proton Conducting Membrane Material for Modern Energy Conversion Technologies," Journal of Membrane Science, 83:211–220 (1993).
J.S. Wainright, et al., "Acid Doped Polybenzimidazoles, A New Polymer Electrolyte," J. Electrochem. Soc. 142:982–983 (1995).
Daniel I. Livingston, et al., Poly–$\alpha,\beta,\beta$–Trifluorostyrene, Journal of Polymer Science, 20:485–490 (1956).
B. Gupta, et al., "Materials Research Aspects of Organic Solid Proton Conductors," Solid State Ionics, 61:213–218 (1993).

(List continued on next page.)

Primary Examiner—Bernard Lipman
(74) Attorney, Agent, or Firm—Hunton & Williams (57) ABSTRACT

The present invention relates to polymer blends and polymer blend membranes which consist of a polymeric sulfonic acid and of a polymer which contains primary, secondary or tertiary amino groups, which are prepared via mixing of a salt of the polymeric sulfonic acid with the polymer which contains primary, secondary or tertiary amino groups. The invention further relates to the use of polymer blend membranes in membrane fuel cells, polymer electrolyte membrane fuel cells (PEM fuel cells) or direct methanol fuel cells (DMFC), in membrane electrolysis, in aqueous or non-aqueous electrodialysis, in diffusion dialysis, in the perstractive separation of alkenes from alkene/alkane mixtures (here the membranes are in the $SO_3Ag$ form, where the $Ag^+$ forms a reversible complex with the alkene ($\rightarrow$facilitated transport)), in pervaporative separation of water from water/organics mixtures, or in gas separation.

17 Claims, 3 Drawing Sheets

OTHER PUBLICATIONS

F. N. Buchi, et al., "Radiation Grafted and Sulfonated (FEP–g–Polystyrene)—An Alternative to Perfluorinated Membranes for PEM Fuel Cells?," *Society of Automotive Engineering, Inc.,* pp 3.419–3.424 (1992).

Gunther G. Scherer, "Polymer Membranes for Fuel Cells," *Ber. Bunsenges. Phys. Chem.,* 94:1008–1014 (1990).*

S. Surampudi, et al., "Advances in Direct Oxidation Methanol Fuel Cells," *J. Power Sources,* 47:377–385 (1994).*

K. Ledjett, et al., "Die Reversible Membran—Brennstoffzelle," *Dechema Monographs,* vol. 128, pp 103–115 (1993).*

Walther G. Grot, "Perfluorinated Ion Exchange Polymers and Their Use in Research and Industry," *Macromol. Symp.* 82:161–172 (1994).*

E. Montoneri, et al., "Polysulfone–Bonded Polyvinylpyridinium Membranes," *Journal of Applied Polymer Science,* 34:2079–2091 (1987).*

J. Kerres, et al., "Preparation, Characterization and Fuel Cell Application of New Acid–Base Blend Membranes," *J. New Mat. Electrochem. Systems,* 3:129–239 (2000).

* cited by examiner

ACID-BASE POLYMER BLENDS AND THEIR USE IN MEMBRANE PROCESSES

The present invention relates to polymer blends and polymer blend membranes which consist of a polymeric sulfonic acid and of a polymer which contains primary, secondary or tertiary amino groups, which are prepared via mixing of a salt of the polymeric sulfonic acid with the polymer which contains primary, secondary or tertiary amino groups. The invention further relates to the use of polymer blend membranes in membrane fuel cells, polymer electrolyte membrane fuel cells (PEM fuel cells) or direct methanol fuel cells (DMFC), in membrane electrolysis, in aqueous or non-aqueous electrodialysis, in diffusion dialysis, in the perstractive separation of alkenes from alkene/alkane mixtures (here the membranes are in the $SO_3Ag$ form, where the $Ag^+$ forms a reversible complex with the alkene (→facilitated transport)), in pervaporative separation of water from water/organics mixtures, or in gas separation.

A key cost component of the PEM fuel cell is its proton-conducting membrane. The perfluorinated ionomer Nafion® (Grot, W. G.: Perfluorinated Ion-Exchange Polymers and Their Use in Research and Industry, Macromolecular Symposia, 82, 161–172 (1994)) which has been commercially available meets the requirements of chemical stability which must be demanded of membranes for the application in PEM fuel cells (Ledjeff, K.; Heinzel, A.; Mahlendorf, F.; Peinecke, V.: Die reversible Membran-Brennstoffzelle, Dechema-Monographien Band 128, VCH Verlagsgesellschaft, 103–118 (1993)). However, it has various disadvantages which necessitate the search for alternative materials: It is very expensive (DM 1400.–/m²). The very complex production process comprises highly toxic intermediates (see Grot, W. G.). The environment-compatibility of Nafion® is to be evaluated critically: as a perfluorinated polymer, it is hardly degradable. The recyclability of Nafion® is questionable.

When applying Nafion® in direct methanol fuel cells, it was discovered that it shows a very high methanol-permeability, especially when pure methanol is used (Surampudi, S., Narayanan, S. R.; Vamos, E.; Frank, H.; Halpert, G.; LaConti, A.; Kosek, J.; Surya Prakash, G. K.; Olah, G. A.: Advances in direct oxidation methanol fuel cells, J. Power Sources, 47, 377–385 (1994)), which greatly reduces the energy efficiency of the DMFC by mixed potential formation.

Partially fluorinated ionomers are presently under investigation. At this point, the scientific work of G. G. Scherer may be mentioned (Scherer, G. G.: Polymer Membranes for Fuel Cells, Ber. Bunsenges. Phys. Chem. 94, 1008–1014 (1990)); (Scherer, G. G.; Büchi, F. N.; Gupta, B.; Rouilly, M.; Hauser, P. C.; Chapiro, A.: Radiation Grafted and Sulfonated (FEP-g-Polystyrene)—An Alternative to Perfluorinated Membranes for PEM Fuel Cells? Proceedings of the 27th Intersociety Energy Conversion Engineering Conference IECEC-92, San Diego, USA, August 3–7, 3.419–3.424 (1992)); (Gupta, B.; Büchi, F. N.; Scherer, G. G.: Materials Research Aspects of Organic Solid Proton Conductors Solid State Ionics 61, 213–218 (1993)), who formed free radicals in perfluorinated polymer foils using gamma radiation and grafted styrene onto the free radicals formed. Then, the polystyrene chains of the perfluoropolymer-polystyrene IPNs (interpenetrating polymer networks) formed were sulfonated. These polymer membranes showed a good performance when used in PEM fuel cells. However, the synthetic method employed seems to be unsuitable for mass production of this type of membrane. The Canadian company Ballard has developed a partially fluorinated proton-conducting membrane from sulfonated poly($\alpha,\beta,\beta$-trifluorostyrene) (Wei, J.; Stone, C.; Steck, A. E.: Trifluorostyrene and substituted trifluorostyrene copolymeric compositions and ion-exchange membranes formed therefrom, WO 95/08581, Ballard Power Systems). A disadvantage of this membrane is its high price because of the complex production process for the monomer $\alpha,\beta,\beta$-trifluorostyrene (Livingston, D. I.; Kamath, P. M.; Corley, R. S.: Poly-$\alpha,\beta,\beta$-trifluorostyrene, Journal of Polymer Science, 20, 485–490 (1956)) and because of the poor capability of poly($\alpha,\beta,\beta$-trifluorostyrene) of being sulfonated.

In the literature, some references are found relating to the application of arylene main-chain polymers to PEM fuel cells. The most important articles will be mentioned in the following:

Polybenzimidazole-phosphoric Acid

Membranes of the engineering thermoplastic polybenzimidazole are soaked with phosphoric acid (Wainright, J. S.; Wang, J.-T.; Savinell, R. F.; Litt, M.; Moaddel, H.; Rogers, C.: Acid Doped Polybenzimidazoles, A New Polymer Electrolyte, The Electrochemical Society, Spring Meeting, San Francisco, May 22–27, Extended Abstracts, Vol. 94–1, 982–983 (1994))—the phosphoric acid works as a proton conductor. The phosphoric acid molecules are held in the membrane by hydrogen bridges and through protonation of the imidazole moieties with formation of the salt $H_2PO_4^-$ HNpolymer. However, there is a risk with these membranes that the phosphoric acid is gradually washed out of the polybenzimidazole matrix with the water formed in the fuel cell during operation thereof, because the ratio of phosphoric acid molecules to imidazole moieties is about 3:1 in these polymer blends.

Sulfonated Polyethersulfone

An article by Ledjeff (Nolte, R.; Ledjeff, K.; Bauer, M.; Mülhaupt, R.: Partially Sulfonated poly(arylene ether sulfone)—A Versatile Proton Conducting Membrane Material for Modern Energy Conversion Technologies, Journal of Membrane Science 83, 211–220 (1993)) suggests the use of cross-linked sulfonated polyethersulfone ionomers, prepared by electrophilic sulfonation of polyethersulfone, as proton conductors in PEM fuel cells. However, no current-voltage characteristic of the presented membrane is given in this paper, which makes the evaluation of the suitability of this ionomer for PEM fuel cells difficult.

Sulfonated PEEK

In the patent literature, a reference dealing with the use of membranes of sulfonated polyetherketones (PEEK) in PEM fuel cells can be found (Helmer-Metzmann, F.; Ledjeff, K.; Nolte, R., et al.: Polymerelektrolyt-Membran und Verfahren zu ihrer Herstellung, EP 0 574 791 A2). These polymers are said to exhibit a good performance and chemical stability in PEM fuel cells. However, these membranes show high swelling values, especially at the high proton conductivities and thus ion-exchange capacities as required for PEM fuel cells, which deteriorates their mechanical properties and thus shortens their service life in fuel cells. In addition, especially when PEEK is sulfonated heterogeneously, there is a risk that the polymer partially recrystallizes (unmodified PEEK is partially crystalline), leading to brittleness.

Sulfonated Polyphenylenes

Membranes prepared from organic solvent soluble sulfonated, chemically and thermally stable polyphenylenes as alternative materials to replace Nafion® for use in PEM fuel cells are suggested by Matejcek, L.; Nolte, R.; Heinzel, A.; Ledjeff, K.; Zerfass, T.; Mülhaupt, R.; Frey, H.: Die Membranbrennstoffzelle: Untersuchungen an Membran/Elektrodeneinheiten, Jahrestagung 1995 der Fachgruppe Angewandte Elektrochemie der GDCh, Duisburg, 27.–29. Sept. 1995, Abstract Poster Nr. 20 (1995). However, no investigations of these membranes in PEM fuel cells have been published so far.

Sulfonated Polyphenylene Sulfide

Miyatake, K.; Iyotani, H.; Yamamoto, K.; Tsuchida, E.: Synthesis of Poly(phenylene sulfide sulfonic acid) via Poly (sulfonium cation) as a Thermostable Proton-Conducting Polymer, Macromolecules 1996, 29, 6969–6971 (1996), reports the preparation of a chemically and thermally stable sulfonated polyphenylene sulfide via a polysulfonium cation intermediate. A disadvantage of this preparation process is its being relatively complicated and thus expensive.

Acid-base polymer blends based on vinyl polymers are often mentioned in the relevant literature (Bazuin, C. G.: Ionomers (Compatibilization of Blends), in: Polymeric Materials Encyclopedia (Ed.-in-Chief J. C. Salomone), Vol. 5 (H-L), CRC Press (Boca Raton, New York, London, Tokyo) 3454–3460 (1996)), for example, those acid-base blends containing polymethacrylates as the acidic component and polyvinyl-pyridinium salts as the basic component (Zhang, X.; Eisenberg, A.: NMR and Dynamic Mechanical Studies of Miscibility Enhancement via Ionic Interactions in Polystyrene/poly(ethyl Acrylate) Blends, J. Polym. Sci.: Part B: Polymer Physics, 28, 1841–1857 (1990)). These acid-base blends have been investigated, e.g., in terms of compatibility between the acidic and basic blend components. Practical applications of these acid-base polymer blends have not become public so far.

As mentioned above, the provision of chemically stable ionomer membranes for electro-membrane processes, especially for membrane fuel cells, is an important area of research. The ionomer membranes should be selected from the group of arylene main-chain polymer membranes, because these polymers exhibit the highest chemical stability next to the perfluorinated polymers. Acid-base blends based on PEEK are described in Kerres, J.; Cui, W.; Wagner, N.; Schnurnberger, W.; Eigenberger, G.: A.7 Entwicklung von Membranen für die Elektrolyse und für Membranbrennstoffzellen, Vortrag, "Jahreskolloquium 1997 des Sonderforschungsbereichs 270—Energieträger Wasserstoff", Sep. 29, 1997, Berichtsband p. 169–193 (1997); ISBN: 3-00-001796-8; Cui, W.; Kerres, J.; Eigenberger, G.: Development and Characterization of Ion-Exchange Polymer Blend Membranes, Poster, Euromembrane '97, "Progress in Membrane Science and Technology", University of Twente, Jun. 23–27, 1997, Abstracts p. 181 (1997). The polymer blends are prepared by mixing poly(etheretherketonesulfonic acid) (PEEK $SO_3H$) and poly(ethersulfone-ortho-sulfonediamine) (PSU-$NH_2$) in a dipolar-aprotic solvent followed by evaporation of the solvent. The publications describe the characterization of these special polymer blends in terms of ionic conduction, swelling, permselectivity and thermal resistance, and the use of one of these membranes alone in electrodialysis. With the method described (mixing of the polymeric sulfonic acid with the polymeric amine), only those acid-base blends can be prepared which have a very weakly basic amine component, such as poly(ethersulfone-ortho-sulfone diamine). Stronger polymeric bases immediately form an insoluble polyelectrolyte complex upon mixing with the polymeric sulfonic acid.

On principle, all sulfonated aryl polymers exhibit a high brittleness when drying out, for example, when they are applied in fuel cells at intermittent conditions. The reduction in brittleness of the sulfonated aryl polymer ionomers has thus priority in their further development for long-term application in PEM fuel cells.

In a first embodiment, the above object is achieved by a process for the preparation of ion-exchange membranes, characterized in that solutions of polymeric sulfonic acid salts having the general formula polymer-$SO_3X$, where X=monovalent metal cations, $NH_4^+$, $NH_3R^+$, $NH_2R_2^+$, $NHR_3^+$, $NR_4^+$, pyridinium, R=any alkyl and/or aryl radical, are reacted with polymers containing primary, secondary or tertiary nitrogen in dipolar-aprotic solvents, and the obtained polymeric sulfonic acid salt/base blends are aftertreated in hot diluted mineral acid at 20 to 100° C. after storage.

BRIEF DESCRIPTION OF THE DRAWINGS

The three figures are comparative curves for two different membranes of their current-voltage characteristics in different modes.

At least the polymeric sulfonic acid or the sulfonic acid salt of the polymer blend membranes of the invention consists of an arylene main-chain polymer (for example, polyethersulfone, polyetherketone, polyphenylene oxide), whereby a high mechanical, chemical and thermal stability of the polymer blends is obtained, which makes the membranes of the invention a reasonable alternative of the Nafion® type perfluorinated ionomer membranes mainly used to date in PEM fuel cells and DMFCs.

It has been found that mixing a polymeric sulfonic acid, for example, poly(ethersulfonesulfonic acid), or a poly (etherketonesulfonic acid salt) of general formula I (I)

poly(ethersulfonesulfonic acid) PSU Udel® with 2 sulfonic acid groups per repeating unit; obtainable according to Kerres, J.; Cui, W.; Reichle, S.: New sulfonated engineering polymers via the metalation route. I. Sulfonated poly (ethersulfone) (PSU Udel®) via metalation-sulfination-oxidation, Journal of Polymer Science, Part A: Polymer Chemistry 34, 2421–2438 (1996)), or poly(etheretherketonesulfonic acid) of general formula II (II)

poly(etherketonesulfonic acid) with 1 sulfonic acid group per repeating unit; prepared according to Helmer-Metzmann et al., with poly(ethersulfone-ortho-sulfone-diamine) of general formula III (III)

poly(ethersulfone-ortho-sulfone-diamine) with 2 primary amino groups per repeating unit, prepared according to Guiver, M. D.; Robertson, G. P.; Foley, S.: Chemical Modification of Polysulfones II: An Efficient Method for Introducing Primary Amine groups onto the aromatic chain Macromolecules 28, 7612–7621 (1995), yields a polymer blend which is surprisingly characterized by the following properties:

(1) a high reduction in brittleness as compared to the respective pure polymeric sulfonic acid;

(2) water-soluble polymeric sulfonic acids surprisingly lose their water-solubility upon mixing with the polymeric basic nitrogen compound because of the interactions between the polymeric chains of the blend components;

(3) such acid-base blends prepared from water-soluble polymeric sulfonate salts or sulfonic acids exhibit surprisingly high ion-exchange capacities of up to 2.7 meq $SO_3H/g$ of polymer (sulfonated polymers of this capacity are readily water-soluble normally), which leads to extremely low electric resistances (Example 11: $R_{a,H^+}$= 0.05 $\Omega \cdot cm^2$, $R_{sp,H^+}$=5.88 $\Omega \cdot cm$).

(4) surprisingly, the acid-base blends exhibit a methanol permeability which is reduced by a factor of 60–250 as compared to Nafion®, which probably renders their use in DMFCs advantageous;

(5) surprisingly, the acid-base blends show an excellent performance in $H_2$-PEFCs and DMFCs;

As described above, no precipitation of polyelectrolyte complex occurs in solutions of very weak polymeric bases, such as poly(ethersulfone-ortho-sulfonediamine), in dipolar-aprotic solvents, such as N-methyl pyrrolidinone (NMP), N,N-dimethylacetamide (DMAc), N,N-dimethylformamide (DMF), or dimethylsulfoxide (DMSO) when mixed with polymeric sulfonic acids. However, when stronger polymeric bases are employed, precipitation of a polyelectrolyte complex occurs through formation of the polysalt upon mixing the solution of such base in dipolar-aprotic solvents with a solution of the polymeric sulfonic acid in dipolar-aprotic solvents. Examples of a polymeric base which forms polyelectrolyte complexes with polymeric sulfonic acids include poly(4-vinylpyridine). The polyelectrolyte forming reaction is as follows:

PPy+P'—$SO_3H$→PPyH$^+$$^-$$O_3S$—P'

Surprisingly, it has now been found that single-phase solutions can be produced by mixing solutions of a polymeric sulfonic acid salt (example: poly(etheretherketone Li sulfonate) or poly(ethersulfone Li sulfonate)) with solutions of a polymeric base (example: poly(ethersulfone-ortho-sulfone-diamine), poly(4-vinylpyridine), poly (ethyleneimine), poly-(aniline); after evaporation of the solvent, they form clear, transparent and mechanically and thermally stable polymer blend films. When such polymer blend films are aftertreated with diluted mineral acids at temperatures of from 20 to 100° C. after their preparation, even those acid-base blends are obtained via this route which are not directly available by mixing the solution of the polymeric sulfonic acid with the polymeric amine because of polyelectrolyte precipitation. By this method, for example, compatible blends of poly(4-vinylpyridine) with poly(ethersulfonesulfonic acid) can be obtained, which are not directly available from poly(4-vinylpyridine) and poly (ethersulfonesulfonic acid) because of polyelectrolyte precipitation.

By the above-mentioned roundabout route, almost any polymeric sulfonic acid/any polymeric sulfonic acid salt can be combined with almost any polymeric (primary/secondary/tertiary) amine to give at least a compatible polymer blend. The properties of the respective acid-base blend can be tailored by appropriate selection of the reaction partners.

The advantageous properties of the acid-base blends are due to specific interactions between the polymeric chains of the blend components (see Bazuin, C. G.; Zhang, X.; Eisenberg, A.: NMR and Dynamic Mechanical Studies of Miscibility Enhancement via Ionic Interactions in Polystyrene/poly(ethyl Acrylate) Blends, J. Polym. Sci.: Part B: Polymer Physics, 28, 1841–1857 (1990)):

hydrogen bridges acid-base interactions ion-dipole interactions

These specific interactions result in compatibility and in part in molecular miscibility of the polymeric sulfonic acids/polymeric sulfonic acid salts with the polymeric basic nitrogen compounds.

In addition to the applications already mentioned, i.e., direct methanol and $H_2$ membrane fuel cells, the acid-base blends can be advantageously used in other membrane processes:

membrane electrolysis aqueous or non-aqueous electrodialysis diffusion dialysis separation of alkenes from alkene/alkane mixtures (here the membranes are in the $SO_3Ag$ form, where the $Ag^+$ reversibly complexes the alkene and thus selectively carries it through the membrane (→facilitated transport) (van Zyl, A. J.; Linkov, V. M.; Bobrova, L. P.; Timofeev, S. V: Perfluorosulfonate Ionomer Membranes for Separation of Petrochemical Mixtures, J. Mat. Sci. Lett., 15, 1459 (1996)) via gas separation, pervaporation or perstraction.

pervaporative separation of water from water/organics mixtures separation of water vapor from its mixtures with permanent gases or with organics.

EXAMPLES

Reference Example

Preparation of an Acid-base Blend from Sulfonated PEEK and Aminated PSU (by Analogy with J. Kerres et al., supra)

Poly(etheretherketonesulfonic acid) Victrex® was prepared according to Helmer-Metzmann et al. The polymer exhibits an ion-exchange capacity of 1.66 meq $SO_3H/g$. Aminated polysulfone Udel® was prepared by known processes (by analogy with Guiver et al., supra). This polymer has 2 amino groups per repeating unit. The poly (etheretherketone-sulfonic acid) and the aminated polysulfone were mixed in different mixing ratios (Table 1), and the resulting mixture was dissolved in N-methylpyrrolidinone to give a 15% by weight solution. After its preparation, the solution was filtered and degassed. Subsequently, the polymer solution was spread on a support (e.g., glass plate) to give a thin film, and then the solvent was evaporated at 125° C. in an oven with circulating air or in a vacuum-drying chamber. After the evaporation of the solvent, the glass plate with the polymeric film was placed in a trough with deionized water. After ½ h, the membrane had separated from the glass plate. The membrane was aftertreated first in 1 N HCl for 48 h and then in deionized water for 48 h, each at 60° C. Subsequently, its properties were characterized. The characterization results are listed in Table 1.

TABLE 1

Composition and properties of blend membranes from sulfonated PEEK and aminated PSU

| Ex. | Composition | Swelling [%] | IEC [meq/g] | Permselectivity [%] | $R_a$ [$\Omega \cdot cm^2$] | $R_{sp}$ [$\Omega \cdot cm$] |
|---|---|---|---|---|---|---|
| 1 | 4.25 g PEEK(SO$_3$H)$_{0.5}$<br>0.75 g PSU(NH$_2$)$_2$ | <40 | 1.34 | | 0.109 | 18.2 |
| 2 | 4.5 g PEEK(SO$_3$H)$_{0.5}$<br>0.5 g PSU(NH$_2$)$_2$ | <50 | 1.58 | | 0.101 | 34.8 |
| 3 | 4 g PEEK(SO$_3$H)$_{0.5}$<br>1 g PSU(NH$_2$)$_2$ | 23.81 | 1.4 | 94.44 | 0.25 | 46.41 |
| 4 | 4.25 g PEEK(SO$_3$H)$_{0.5}$<br>0.75 g PSU(NH$_2$)$_2$ | 29.5 | 1.63 | 97.1 | | 24.8 |
| 5 | 4 g PEEK(SO$_3$H)$_{0.5}$<br>1 g PSU(NH$_2$)$_2$ | 28.4 | 1.54 | 95 | | 23.6 |
| 6 | 3.5 g PEEK(SO$_3$H)$_{0.5}$<br>1.5 g PSU(NH$_2$)$_2$ | 21.4 | 1.42 | 98.2 | | 50.3 |
| 7 | 2.4 g PEEK(SO$_3$H)$_{0.5}$<br>1.6 g PSU(NH$_2$)$_2$ | 16.7 | 1.13 | 99.5 | | 105.5 |

Examples 1 to 11
Synthesis of an Acid-base Blend from Sulfonated PSU and Aminated PSU Poly(ethersulfonesulfonic acid) Udel® was prepared according to Kerres et al. The polymer has either an ion-exchange capacity of 2.6 meq SO$_3$H/g (water-soluble), or an ion-exchange capacity of 1.7 meq SO$_3$H/g (water-insoluble). Aminated polysulfone Udel® was prepared according to Guiver et al. This polymer has 2 amino groups per repeating unit. The poly(ethersulfonesulfonic acid) and the aminated polysulfone were mixed in different mixing ratios (Table 2), and the resulting mixture was dissolved in N-methylpyrrolidinone to give a 15% by weight solution. After its preparation, the solution was filtered and degassed. Subsequently, the polymer solution was spread on a support (e.g., glass plate) to give a thin film, and then the solvent was evaporated at 125° C. in an oven with circulating air or in a vacuum-drying chamber. After the evaporation of the solvent, the glass plate with the polymeric film was placed in a trough with deionized water. After ½ h, the membrane had separated from the glass plate. The membrane was aftertreated first in 1 N HCl for 48 h and then in deionized water for 48 h, each at 60° C. Subsequently, its properties were characterized. The characterization results are listed in Table 2.

TABLE 2

Composition and properties of blend membranes from sulfonated and aminated PSU

| Ex. | Composition | Swelling [%] | IEC [meq/g] | Permselectivity [%] | $R_a$ [$\Omega \cdot cm^2$] | $R_{sp}$ [$\Omega \cdot cm$] |
|---|---|---|---|---|---|---|
| 1 | 3 g PSUSO$_3$H<br>1 g PSU(NH$_2$)$_2$ | 26.83 | 1.44 | 97.25 | 0.261 | 70.41 |
| 2* | 2.8 g PSUSO$_3$Li<br>0.7 g PSU(NH$_2$)$_2$ | 20.22 | 1.27 | 99.18 | 0.68 | 65.34 |
| 3 | 4.2 g PSUSO$_3$H<br>1.8 g PSU(NH$_2$)$_2$ | 17.04 | 1.09 | 99.74 | 0.966 | 148.61 |
| 4 | 5.4 g PSUSO$_3$H<br>0.6 g PSU(NH$_2$)$_2$ | 40.54 | 1.59 | 92.14 | 0.139 | 13.93 |
| 5 | 4.8 g PSUSO$_3$H<br>1.2 g PSU(NH$_2$)$_2$ | 30.6 | 1.54 | 97.05 | 0.28 | 29.09 |
| 6 | 3 g PSUSO$_3$H<br>3 g PSU(NH$_2$)$_2$ | 11.70 | 0.42 | 99.58 | — | — |
| 7 | 3.6 g PSUSO$_3$H<br>2.4 g PSU(NH$_2$)$_2$ | 13.86 | 0.97 | 99.24 | 3.21 | 401.1 |
| 8 | 4.2 g PSU(SO$_3$H)$_{1.6}$<br>1.8 g PSU(NH$_2$)$_2$ | 42.07 | 2.1 | — | 0.094 | 14.46 |
| 9 | 4.8 g PSU(SO$_3$H)$_{1.6}$<br>1.2 g PSU(NH$_2$)$_2$ | 63.27 | 2.31 | — | 0.057 | 7.92 |
| 10 | 5.28 g PSU(SO$_3$H)$_{1.6}$<br>0.72 g PSU(NH$_2$)$_2$ | 120.77 | 2.57 | — | 0.0475 | 5.52 |
| 11 | 5.58 g PSU(SO$_3$H)$_{1.6}$<br>0.42 g PSU(NH$_2$)$_2$ | 306.25 | 2.66 | — | 0.05 | 5.88 |

*The membrane was prepared by mixing PSU-Li sulfonate and aminated PSU.

Example 12
Preparation of an Acid-base Blend from Sulfonated PSU and Poly(4-vinylpyridine)

5.7 g of sulfonated PSU in the SO$_3$Li form (IEC=1.6 meq/g) was dissolved in 24 g of N-methylpyrrolidinone (NMP). Subsequently, 0.3 g of poly(4-vinylpyridine) (MW= 200,000 g/mol) was weighed and dissolved in this solution. After its preparation, the solution was filtered and degassed. Subsequently, the polymer solution was spread on a support (e.g., glass plate) to give a thin film, and then the solvent was evaporated at 125° C. in an oven with circulating air or in a vacuum-drying chamber. After the evaporation of the solvent, the glass plate with the polymeric film was placed in a trough with deionized water. After ½ h, the membrane had separated from the glass plate. The membrane was aftertreated first in 1 N HCl for 48 h and then in deionized water for 48 h, each at 70° C. Subsequently, its properties were characterized.

Characterization results:

| | |
|---|---|
| Ion-exchange capacity: | IEC = 1.2 meq SO$_3$H/g of polymer |
| Thickness: | d = 65 μm |
| Swelling (H$_2$O, RT, H$^+$ form): | SW = 32.2% |
| Surface resistance (RT, H$^+$ form): | 0.144 Ω · cm$^2$ (measured in 0.5N HCl) |
| Specific resistance (RT, H$^+$ form): | 22.1 Ω · cm |

Example 13
Preparation of an Acid-base Blend from Sulfonated PSU and Polyethyleneimine 3 g of water-soluble sulfonated polysulfone Udel® in the SO$_3$Li form (ion-exchange capacity 2.5 meq SO$_3$H/g of polymer) was dissolved in 17 g of N,N-dimethylacetamide (DMAc). Subsequently, 0.322 g of 50% by weight aqueous polyethyleneimine solution (ALDRICH; prod. No. 18,197–8) was added dropwise to the solution. After its preparation, the solution was filtered and degassed. Subsequently, the polymer solution was spread on a support (e.g., glass plate) to give a thin film, and then the solvent was evaporated at 125° C. in an oven with circulating air or in a vacuum-drying chamber. After the evaporation of the solvent, the glass plate with the polymeric film was placed in a trough with deionized water. After ½ h, the membrane had separated from the glass plate. The membrane was aftertreated first in 1 N HCl for 48 h and then in deionized water for 48 h, each at 70° C. Subsequently, its properties were characterized.

Characterization results:

| | |
|---|---|
| Ion-exchange capacity: | IEC = 1.65 meq SO$_3$H/g of polymer |
| Thickness: | d = 110 μm |
| Swelling (H$_2$O, RT, H$^+$ form): | SW = 160% |
| Surface resistance (RT, H$^+$ form): | 0.0623 Ω · cm$^2$ (measured in 0.5N HCl) |
| Specific resistance (RT, H$^+$ form): | 5.67 Ω · cm |

Figure 1:
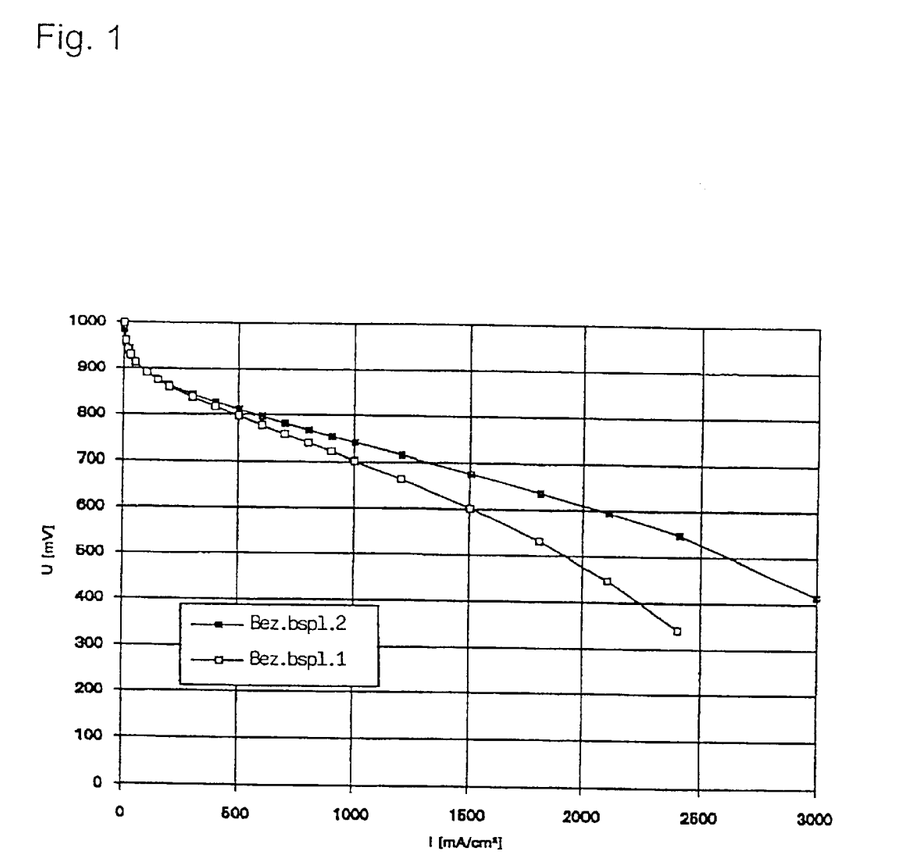

Reference Example 8
Application of an Acid-base Blend Membrane in an H$_2$-PEFC Two of the membranes (Reference Example 2, upper curve, and Reference Example 1, lower curve in FIG. 1) were tested in an H$_2$-PEFC in oxygen and in air mode. The membranes were coated with SIEMENS electrodes having a Pt content of 4 mg of Pt/g.

The experimental conditions in O$_2$/H$_2$ mode were:

| | |
|---|---|
| Pressure: | 2 bar absolute |
| Lambda: | 2 |
| Temperature: | 80° C. |

The current-voltage characteristic obtained in O$_2$/H$_2$ mode is shown in FIG. 1.

Figure 2:
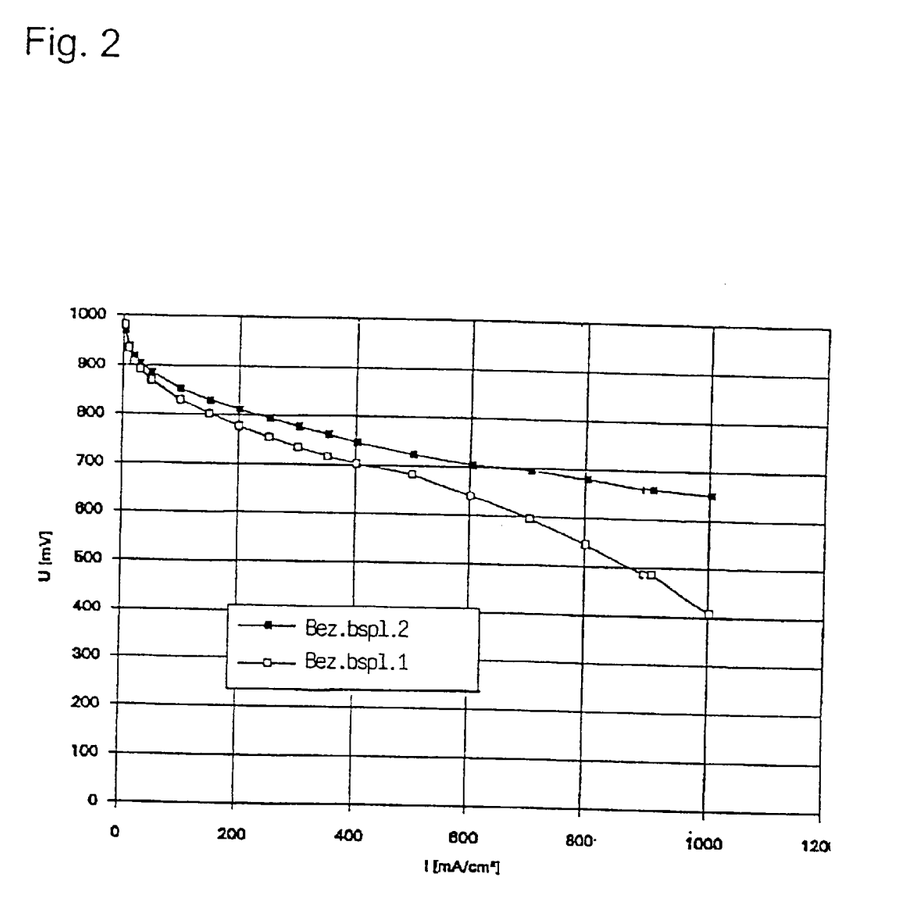

The experimental conditions in air/H$_2$ mode were:

| | |
|---|---|
| Pressure: | 1.5 bar absolute |
| Lambda: | 10 |
| Temperature: | 65° C. |

The current-voltage characteristic obtained in air/H$_2$ mode is shown in FIG. 2.

From FIGS. 1 and 2, it can be seen that the performance of the membranes examined in H$_2$ fuel cells is excellent both in O$_2$ and in air mode.

Example 14
Application of an Acid-base Blend Membrane in a DMFC

One of the membranes (Reference Example 1) was tested in a direct methanol fuel cell (DMFC) in air mode. The membranes were coated with SIEMENS electrodes. The concentration of methanol in the methanol/water mixture was 0.5 mol/l.

The experimental conditions in air/methanol mode were as follows:

| | |
|---|---|
| Pressure: | 1.5/1.5 bar absolute |
| Flow: | 100 ml/min air |
| Temperature: | 80° C. |

Figure 3:
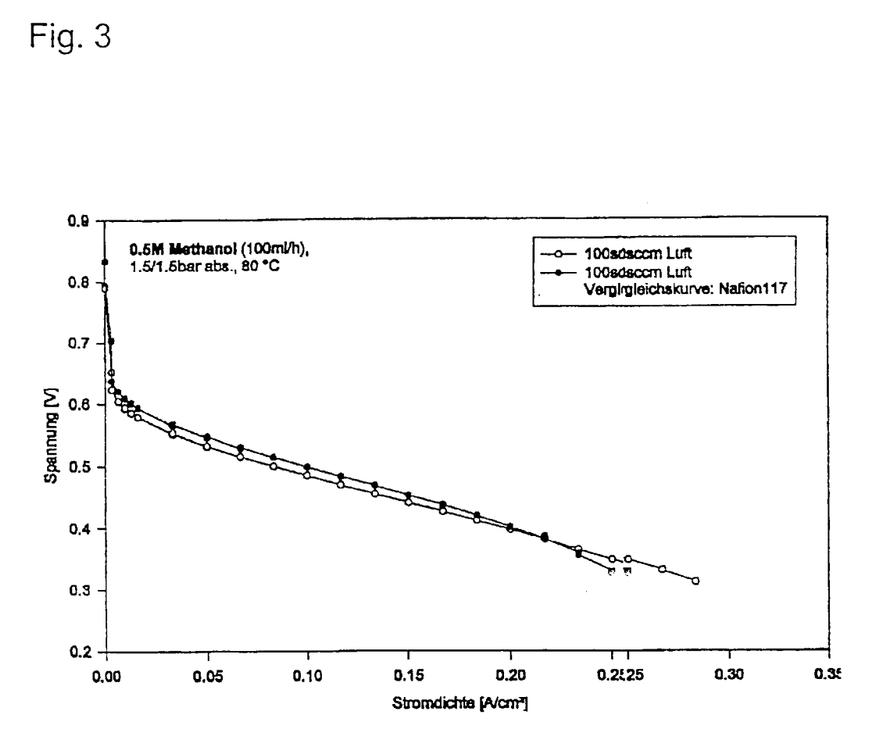

The current-voltage characteristic obtained in air/methanol mode is shown in FIG. 3.

From FIG. 3, it can be seen that surprisingly the performance of the membrane is nearly as good as that of Nafion® 117. By a further thickness reduction of the membrane and/or reduction of its methanol permeability by incorporating a higher level of aminated PSU, even a better performance of the membranes as compared to Nafion is obtained.

What is claimed is:

1. A process for the preparation of ion-exchange membranes, comprising reacting solutions of polymeric sulfonic acid salts having the general formula polymer-SO$_3$X, where X=monovalent metal cations, NH$_4^+$, NH$_3$R$^+$, NH$_2$R$_2^+$, NHR$_3^+$, NR$_4^+$, pyridinium, R=any alkyl and/or aryl radical, with polymers containing primary, secondary or tertiary nitrogen in dipolar-aprotic solvents, and after-treating the obtained polymeric sulfonic acid salt/base blends in hot diluted mineral acid at 20 to 100° C.

2. Blend polymers and blend polymer membranes, obtained by a process comprising:

reacting solutions of polymeric sulfonic acid salts with polymers containing primary, secondary or tertiary nitrogen in dipolar-aprotic solvents, wherein the polymeric sulfonic acid salts have the general formula polymer-SO$_3$X wherein X is selected from group consisting of monovalent metal cations, $NH_4^+$, $NH_3R^+$, $NH_2R_2^+$, $NHR_3^+$, $NR_4^+$, and pyridinium, and wherein R is any alkyl and/or aryl radical; and after-treating the obtained polymeric sulfonic acid salt/base blends in hot diluted mineral acid at 20 to 100° C.

3. The polymer blend according to claim 2, wherein the polymers of the polymeric sulfonic acid salts reacted with polymers containing primary, secondary or tertiary nitrogen are selected from the group consisting of polyetheretherketones, polyethersulfones, polyphenylsulfones, polyphenylene sulfides and polyphenylene oxides.

4. The polymer blend according to claim 2, wherein the polymers of the polymeric sulfonic acid salts reacted with said nitrogen-containing polymers are selected from polymers having aromatic core structures of formulas $R_1$ or $R_2$ as repeating units, where (R1)

(R2)

wherein
$R_3$ is hydrogen, trifluoromethyl or $C_nH_{2n+1}$, wherein n=1 to 10,
$R_4$ is hydrogen, $C_nH_{2n+1}$, wherein n=1 to 10, and
x=1, 2 or 3
and which are connected via bridge groups $R_5$ or $R_6$ where
$R_5$ is —O—; and
$R_6$ is —$SO_2$—.

5. The polymer blend according to claim 2, wherein the polymeric sulfonic aid salts are dissolved in dipolar-aprotic solvents, optionally followed by adding an equimolar amount, corresponding to the polymer's content of $SO_3H$ groups, of a low-molecular weight primary, secondary or tertiary amine, and then another polymer containing primary, secondary or tertiary basic nitrogen groups is dissolved in the polymer solution obtained.

6. The acid-base polymer blends according to claim 2 in the form of thin films (membranes) adapted for use as proton-conducting electrolytes in membrane fuel cells ($H_2$ polymer electrolyte fuel cells or direct methanol fuel cells), in polymer electrolyte membrane (PEM) electrolysis, in aqueous or non-aqueous electrodialysis, or in diffusion dialysis.

7. The acid-base polymer blends according to claim 2 in the form of thin films (membranes) or in the form of hollow fibers adapted for use in pervaporation, perstraction, gas separation, dialysis, ultrafiltration, nanofiltration or reverse osmosis.

8. The polymer blend according to any one of claim 3, 4, 5, or 2, wherein the polymers of the polymeric sulfonic acid salts are selected from the group consisting of poly(etheretherketones) and poly(ethersulfones).

9. The polymer blend according to any one of claim 3, 4, 5, or 2, wherein the polymers containing primary, secondary or tertiary basic nitrogen groups are selected from the group consisting of poly(etheretherketones) and poly(ethersulfones).

10. The polymer blend according to claim 4, wherein said polymers having aromatic core structures are selected from the group consisting of:

poly(etheretherketones) having the structural formula ($[R_5—R_2—R_5—R_2—R_7—R_2]_n$, wherein for $R_2$ x=1 and $R_4$=H)

poly(ethersulfones) having the structural formula ($[R_1—R_5—R_2—R_6—R_2—R_5]_n$; wherein for $R_2$ x=1 and $R_4$=H), poly(ethersulfones) having The structural formula ($[R_2—R_6—R_2—R_5]_n$; wherein for $R_2$ x=1 and $R_4$=H), poly(phenylsulfones) having the structural formula ($[(R_2)_2—R_5—R_2—R_6—R_2]_n$; wherein for $R_2$ x=2 and $R_4$=H), poly(etherethersulfones) having the structural formula ($[R_5—_2—_5—_2—_6]_n—[R_5R_2—_6—_2]_n$; wherein for $R_2$ x=1, $R_4$—H, and n/m=0.18), poly(phenylenesulfides) having the structural formula ($[R_2—_8]_n$; wherein for $R_2$: x=1 and $R_4$=H), and poly(phenyleneoxides) having the structural formula ($[R_2—_5]_n$; wherein for $R_2$ $R_4$=$CH_3$)

wherein $R_7$ is >C=O, and $R_8$ is —S—.

11. Blend polymers and blend polymer membranes according to any one of claim 3, 4, 5 or 2 wherein the polymers of the polymeric sulfonic acids are selected from the goup consisting of poly(etheretherketones) and poly(ethersulfones), and wherein said polymers containing primary, secondary or tertiary nitrogen groups are selected from the group consisting of poly(etheretherketones) and poly(ethersulfones).

12. The process according to claim 1, wherein the polymers of the polymeric sulfonic acid salts reacted with polymers containing primary, secondary or tertiary nitrogen are selected from the group consisting of polyetheretherketones, polyetherslulfones, polyphenylsulfones, polyphenylene sulfides and polyphenylene oxides.

13. The process according to claim 1, wherein the polymers of the polymeric sulfonic acid salts reacted with said nitrogen-containg polymers are selected from polymers having aromatic core structures of formulas $R_1$ or $R_2$ repeating units, where (R1)

(R2)

wherein
$R_3$ is hydrogen, trifluoromethyl or $C_nH_{2n+1}$, wherein n=1 to 10,
$R_4$ is hydrogen, $C_nH_{2n+1}$, wherein n=1 to 10, and
x=1, 2 or 3 and which are connected via bridge groups $R_5$ or $R_6$ where $R_5$ is —O—; and $R_6$ is —$SO_2$—.

14. The process according to claim 1, wherein the polymeric sulfonic acid salts are dissolved in dipolar-aprotic solvents, optionally followed by adding an equimolar amount, corresponding to the polymer's content of $SO_3H$ groups, of a low-molecular weight primary, secondary or tertiary amine, and then another polymer containing primary, secondary or tertiary basic nitrogen groups is dissolved in the polymer solution obtained.

15. The process according to any of claim 1, 12, 13, or 14, wherein said solvents are selected from N-methylpyrrolidone, N,N-dimethylacetamide, N,N-dimethylformamide, solfolane and dimethylsulfoxide.

16. The process according to any one of claim 1, 12, 13, or 14, wherein the polymers of the polymeric sulfonic acid salts are selected from the group consisting of poly(etheretherketones) and poly(ethersulfones).

17. The proress according to claim 13, wherein said polymers having aromatic core structures are selected from the group consisting of:

poly(etheretherketones) having the structural formula ($[R_5-_2-_5-_2-_7-_2]_n$, wherein for $R_2$, x=1 and $R_4$=H)

poly(ethersulfones) having the structural formula ($[R_1-_5-_2-_6-_2-_5]_n$; wherein for $R_2$, x=1 and $R_4$=H), poly(ethersulfones) having the structural formula ($[R_2-_6-_2-_5]_n$; wherein for $R_2$, x=1 and $R_4$=H), poly(phenylsulfones) having the structural formula ($[(R_2)_2-_5-_2-_6-_2]_n$; wherein for $R_2$ x=2 and $R_4$=H), poly(etherethersulfones) having the structural formula ($[R_5-_2-_5-_2-_6]_n-[R_5-_2-_6-_2]_m$; wherein for $R_2$, x=1, $R_4$=H, and n/m=0.18), poly(phenylenesulfides) having the stuctural formula ($[R_2-_8]_n$; wherein for $R_2$, x=1 and $R_4$=H, and poly(phenyleneoxides) having the structural formula ($[R_2-_5]_n$; wherein for $R_2$ $R_4$=$CH_3$)

wherein $R_7$ is >C=O, and $R_8$ is —S—.

* * * * *